United States Patent [19]

Brogardh et al.

[11] Patent Number: 4,581,530

[45] Date of Patent: Apr. 8, 1986

[54] FIBER-OPTIC LUMINESCENCE SENSOR UTILIZING INTERFERENCE IN A THIN LAYER STRUCTURE

[75] Inventors: Torgny Brogardh; Bertil Hök; Christer Ovren, all of VästerÅs, Sweden

[73] Assignee: Asea Aktiebolag, VästerÅs, Sweden

[21] Appl. No.: 554,058

[22] Filed: Nov. 21, 1983

[30] Foreign Application Priority Data

Nov. 22, 1982 [SE] Sweden ................................ 8206634

[51] Int. Cl.$^4$ ........................... G01D 5/30; G01L 7/08
[52] U.S. Cl. ............................ 250/231 R; 250/231 P; 350/96.29; 73/705
[58] Field of Search ............... 250/227, 231 R, 231 P; 350/96.15, 96.20, 96.29; 73/705, 655, 800; 356/32, 35.5

[56] References Cited

U.S. PATENT DOCUMENTS

| | | | |
|---|---|---|---|
| 3,580,082 | 5/1971 | Strack | 73/655 |
| 4,322,979 | 4/1982 | Fromm | 73/705 |
| 4,451,730 | 5/1984 | Brogardh et al. | 73/800 |

*Primary Examiner*—Edward P. Westin
*Attorney, Agent, or Firm*—Watson Cole Grindle & Watson

[57] ABSTRACT

A fiber-optic sensor for measuring a physical quantity or sensing changes therein, consists of a transmitter and receiver unit respectively arranged to transmit and receive optical energy and an optical fiber for transmission of said optical energy to and from a sensor located at the measurement point. The sensor has at least one solid body, which is arranged to emit photoluminescent optical energy in at least one wavelength range, and a volume limited by at least two substantially plane-parallel surfaces, the separation of which is smaller than half the coherence length for either the transmitted or luminescent optical energy, whereby an interference pattern will differently affect the transmission of optical energy to the receiver unit as the optical length between said parallel surfaces changes with changes in the physical quantity being sensed.

20 Claims, 10 Drawing Figures

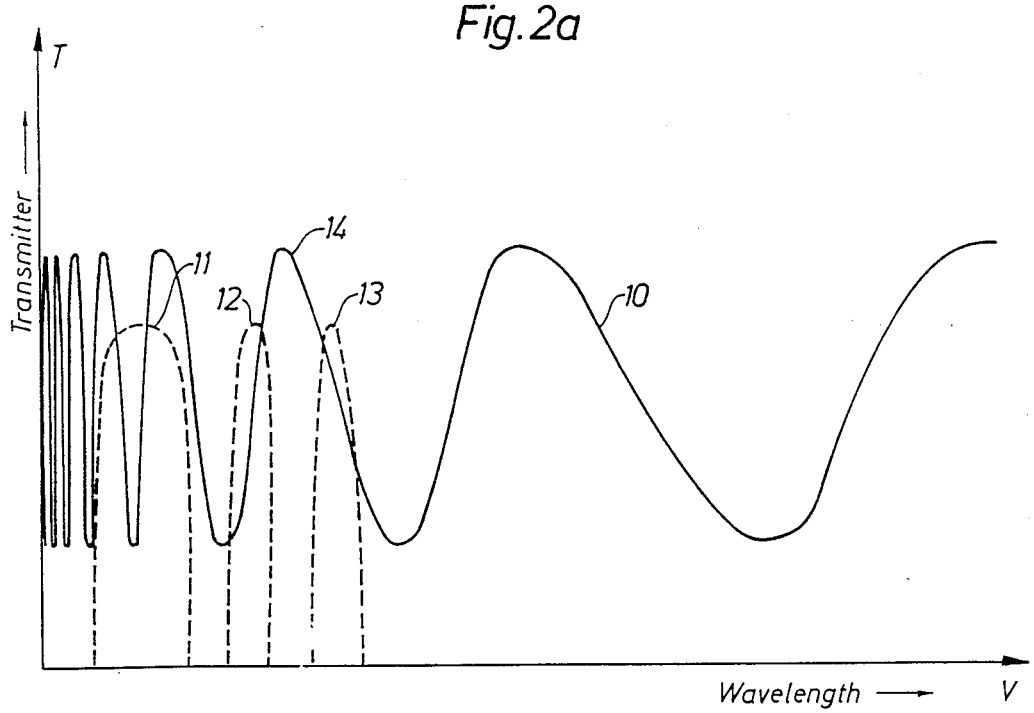
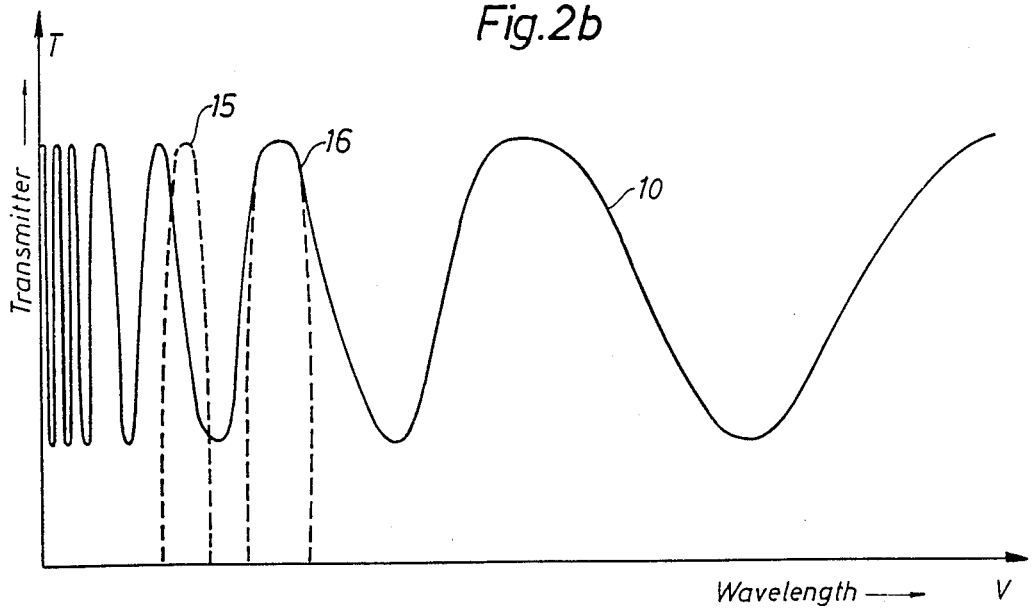

FIBER-OPTIC LUMINESCENCE SENSOR UTILIZING INTERFERENCE IN A THIN LAYER STRUCTURE

BACKGROUND OF THE INVENTION

1. Field of the Invention

The present invention relates to a fiber-optic sensor for measuring or sensing changes in a physical quantity such as pressure, force, acceleration, flow or level and makes of interference patterns generated by multiple reflections between parallel surfaces. A sensor according to the invention would be used in measuring euqipment which includes a transmitter and a receiver unit, respectively arranged to transmit to and receive from the sensor, optical energy. A sensor according to the invention may also include at least one optical fiber for the transmission of optical energy to and from the sensor which has to be located at the point at which the physical quantity is to be measured or sensed.

2. Description of the Prior Art

In the specification of co-pending U.S. patent application Ser. No. 708,095 (the entire disclosure of which is herein incorporated by reference) filed on Mar. 4, 1985 by Brogardh and Ovrén (and assigned to the common assignee of this application ) as a Continuation of application Ser. No. 218,949 there is disclosed a fiberoptic measuring device for measuring a physical quantity such as pressure, force, acceleration, flow, level, temperature or the like which device employs a photo-luminescent body, the geometrical position of which, in relation to an optical fiber, constitutes a measure of the physical quantity to be measured. The position information, such as intensity modulation of one or more wavelength intervals of photoluminescent optical energy, is made available to a transmitter/receiver unit. Since the position information is related to the dimension of the optical fiber, the available range of measurement, and thus the resolution of the device, are limited.

the utilization of modern semiconductor manufacturing processes is a natural choice for the above-mentioned sensors. Their manufacture can then take place in large batches, so that the cost of manufacturing each sensor unit will be largely proportional to the square of the dimensions of the sensor. There if therefore a strong incentive to obtain as high a degree of miniaturization as possible. For sensors which rely upon a measurement of position, the degree of miniaturization of the available measuring range is restricted by non-linearities and physical aspects. Thus, to make the fullest use of available miniaturization techniques, it is desirable to produce a sensor which relies naturally on small size and which can, therefore, provide high accuracy of meaurement even for a very small sensor.

For acoustic applications and cases where a vibration measurement is to be made, there exist further reasons for searching for a miniaturized sensor design which will provide high-resolution accuracy.

SUMMARY OF THE INVENTION

The present invention makes use of a combination of optical interferometric interactions which arise in very thin layers and photoluminescence. By utilizing interference patterns, a signal modulation can be obtained which is related to the wavelength of the optical energy used instead of relying on the fiber dimensions as occurs in the geometrical case described in the aforementioned U.S. patent application Ser. No. 708,095. Since the wavelength of light is smaller than the fiber diameter by at least one order of magnitude, sensors utilizing interference patterns provide manifest advantages in important respects. The sensor according to the invention is characterized in that the sensor portion comprises at least one solid body, which is arranged to emit photoluminescent optical energy in at least one wavelength range, as well as a volume (which can be open or closed) which is limited by at leat two substantially plane-parallel surfaces, the mutual separation of which is smaller than half the coherence length for the emitted or luminescent optical energy. By ensuring that an interference pattern is generated by multiple reflections between the two parallel surfaces, the signal modulation which results due to the interference pattern will become highly sensitive to changes in the optical length existing between the planeparallel surfaces. The utilization of an interference phenomenon implies that hte signal modulation becomes related to a light wavelength, which makes possible a very high resolution. This increases the attainable degree of miniaturization for the sensor, which in turn results in improved manufacturing economy and creates new possibilities for measuring techniques in applications involving acoustics and vibration measurements, etc.

Since a sensor according to the invention makes use of photo-luminescence for wavelength-based signal division and suppression of reflections at fiber joints and branches, embodimetns of a measuring system employing the sensor of this invention will be identicla with the embodiments disclosed in the foresaid U.S. patent application.

BRIEF DESCRIPTION OF DRAWINGS

The invention will now be described in greater detail, by way of example, with reference to the accompanying drawings, in which:

FIGS. 2a and 2b illustrate graphically two different ways of utilizing the wavelength-related signal modulation resulting from an interference pattern.

DESCRIPTION OF PREFERRED EMBODIMENTS

Figure 1A:
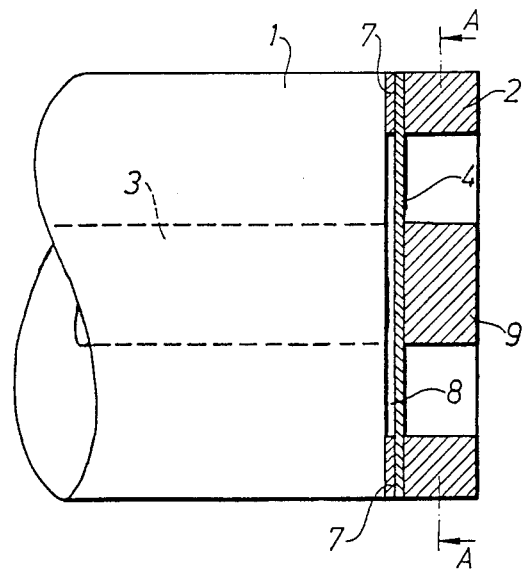
FIG. 1a shows, on a greatly enlarged scale, a partially sectioned side elevation of an optical fiber terminating in a pressure-measuring sensor which utilizes photoluminescence in combination with interference in thin layers.
Figure 1B:
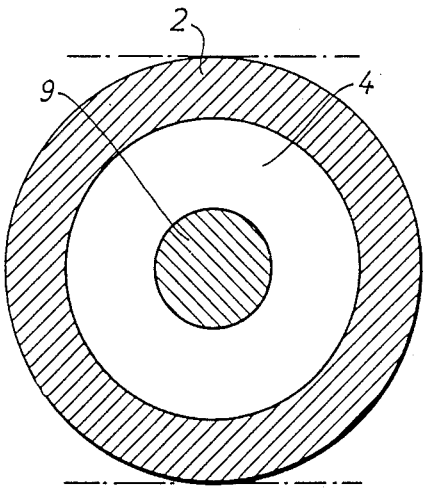
FIG. 1b is a section o the line A—A of FIG. 1a, FIG. 1c is a greatly enlarged view, generally of the circled region of FIG. 1a, showing multiple reflections occurring in the gap between parallel optical surfaces of the sensor.
Figure 1C:
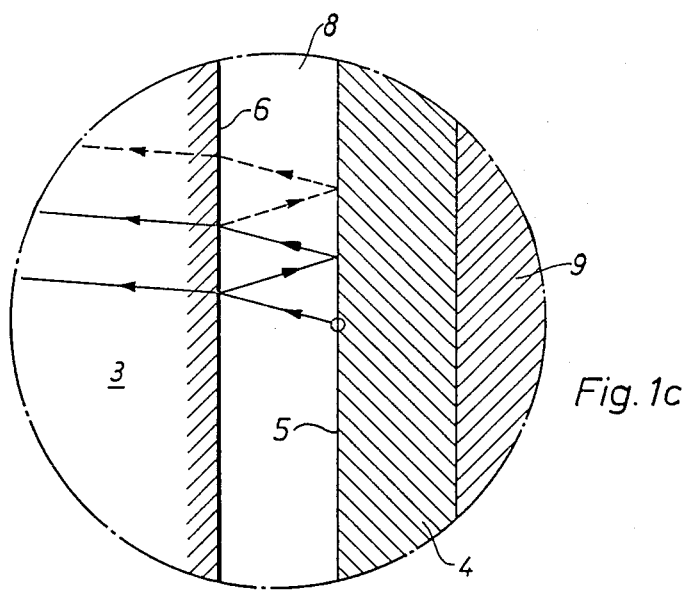

FIG. 1 shows a sensor for the absolute measurement of pressure, which is located at one end of an optical fiber 1. The other end of the fiber 1 is branched and leads both to a tranmitter unit and to a receiver unit, in the manner described in the above-mentioned U.S. patent application. The sensor comprises a solid body 2, which has photoluminescent properties and is arranged to transmit photoluminescent energy in at least one wavelength interval when optically excited. This optical excitation takes place with optical energy fed along the fiber 1 in its central cylindrical core region 3. In the embodiment of sensor shown in FIG. 1, the body 2 includes a fixedly attached flexible diaphragm 4, which forms a substantially plane surface 5 towards the end surface 6 of the fiber. These two surfaces are essentially plane-parallel, by virtue of the use of a spacer ring 7 interposed between the surfaces 5 and 6 and the provision of a non-flexible support 9 bonded to the central region of the diaphragm 4 which confronts the core region 3 of the fiber 1. The plane-parallel surfaces 5 and 6 and the spacer ring 7 define a volume 8, which in this case is closed. Optical energy coming from the surface 5, which may result from luminescence induced by the incident light or from reflection of the incident light, will be subjected to multiple reflections between the respective surfaces 5 and 6 (see FIG. 1c) in the process of being propagated back into the core 3 of the fiber 1.

to use the sensor shown in FIG. 1a to monitor changes in a physical quantity, it is necessary to have those changes in the physical quantity affect the spacing between the surfaces 5 and 6 in the central region of the diaphragm 4 (i.e. the region confronting the end of the light propagating core 3 of the fiber 1).

If the physical quantity is pressure, it can be applied to the side of the diaphragm 4 remote from the fiber 1 and, provided the volume 8 is isolated fro those pressure changes (e.g. by being a closed volume) as the pressure increases the distance between the surfaces 5 and 6 decreases and vice versa.

The number of reflections which will occur will, inter alia, depend on the reflectivity of the surfaces 5 and 6. The reflectivity can be modified, in accordance with known techniques, by surface coating of metallic layers or dielectric layers, where interference may arise. If the distance between the surfaces 5, 6 is small enough (e.g. less than half the wavelength of the optical energy in question), interference will occur and this will affect the intensity distribution of the transmittd and reflected optical energy.

FIGS. 2a and 2b are plots of wavelength V against transmission T for light fed obliquely into a gap between parallel partially-reflecting surfaces which are spaced apart a fixed distance less than half the coherence length for the longest wavelength light used. Curve 10 shows how the intensity of light reflected back oscillates between maxima—when the wavelength is such that in traversing from surface to surface the light travels a sidtance equal to an integral number of whole wavelengths (i.e. there is constructive interferen-ce0—and minima—when the light path equals an integral multiple of half wavelengths (i.e. there is destructive interference).

If now, instead of considering the case where a fixed gap is used with varying wavelength V, we consider the case where a fixed wavelength is used with a varying gap, it will be seen that the transmitted intensity will vary as the gap changes and that the rate of change of this intensity will be a function of how close to producing a maximum or minimum of hte interference curve 10 the current gap happens to be.

When a pressure difference is applied between the volume 8 and the surrounding medium, the diaphragm 4 will flex, because of its elasticity, resulting in a change of the distance between the fiber end surface 6 and the surface 5 of the central portion of the diaphragm 4. By providing the diaphragm 4 with the support 9, bending stresses in the central portion of the diaphragm 4 are provided. In a modified embodiment of the sensor shown in FIG. 1, the support 9 may be of high density material to serve as a seismic mass and provide a senosr sensitive to accelerations. Sensitivity to pressure can be avoided in such an application by making the volume 8 open.

The deviation in parallelism between the surfaces 5, 6 should not exceed one-tenth of a wavelength of the incident light.

The reflecting coating mentioned above may consist of a dielectric material, and the thickness of the dielectric material may be a multiple of half the wavelength for at least one of the luminescent wavelengths or the incident optical energy.

The reflecting coating may be a metallic material, and as mentioned, the volume 8 may be open or closed. If closed, the volume 8 may be evacuated. The closed volume may even consist of a solid material. The mutual distance between the plane-parallel surfaces 5, 6 is determined by the annular spacer 7 as well as the shaping of the elastic portion of the luminescent solid body 2. The volume 8 may be formed as a paor of the solid body 2, and the volume 8 itself may be arranged to emit pjotoluminescent optical energy on suitable excitation.

if changes in a physical quantity to be measured can be made to modify the refractive index of a material in the volume 8, then a sensor such as that shown in FIG. 1 could be used to monitor the changes in such a quantity since a change in refractive index of the material between the surfaces 5 and 6 will affect the optical energy received at the remote end of the fiber 1.

The solid body 2 may be made of a semiconductor material and possibly be formed as at least two different layers. The volume 8 must be optically transparent ithin at least ine wavelength interval. The solid body 2 amy be made of a transparent material with addition of metal ions having luminescent properties. The solid body 2 may also be made of transparent material with the addition of neodymium ions.

As will be appreciated from a consideration of FIG. 1, the solid body 2 may be fabricated from a homogeneous piece of material by etching away undesired sections. The regions to be etched to give the required shape may be defined by known photolithographic techniques. Usable materials which possess suitable luminescent, mechanical and chemical properties are monocrystalline semiconductors with a direct band gap, for example $GaA_x$ and $Al_xGa_{1-x}As$.

the attachment of, and the sealing between, the spacer 7 and the fiber end surface 6 under exact geometrical control may be carried out also employing known techniques, for example by using so-called electrostatic bonding.

FIGS. 2a and 2b also include indications of the spectral response of the incident and luminescent wavelengths and illustrate two ways of combining the characteristic of the interference curve 10 with the photoluminescence properties of the sensor. In FIG. 2a, it is assumed that the sensor is excited by incident light (from for example a light-emitting diode (LED)), the incident light having an optical energy spectrum indicated by the dotted line 11. The location of the line 11 relative to the maxima and minima of the curve 10 ensures good transmission of incident light through the volume 8 throughout the range of different gap widths likely to occur in operation. If the diaphragm 4 is doped with luminescent material which produces two photoluminescence maxima 12, 13 that occur on either side of a maximum 14 of the interference curve 10, any displacement of the maximum 14 caused by a change of the distance between the surfaces 5, 6 will give rise to a change in the intensity distribution between the two photoluminescence maxima 12, 13. This change can easilyu be detected by a variety of different known detector arrangements, for example in the manner described in the above mentioned U.S. patent application.

FIG. 2b illustrates a second mode of operating a sensor according to the invention which relies on just one luminescent material. In FIG. 2b, the spectral characteristic of the incident optical energy is shown at 15 and the spectral characteristic of the photoluminescence is shown at 16. It will be noted that the peak of curve 16 closely corresponds to a peak of the interference curve 10 whereas it is a part of the curve 10 having a steep gradient that intersects the curve 15. Because of this, any change in the spacing apart of the surfaces 5 and 6 will much more significantly affect the transmission of reflected incident light than luminescent light and this difference in gap dependence can be used to monitor changes in the parameter affecting the gap. This can be made use of for sensors, where the static position level of a parameter is of no interest but changes in that level are, for example in acoustic applications and in vibration measurements.

Figure 3A:
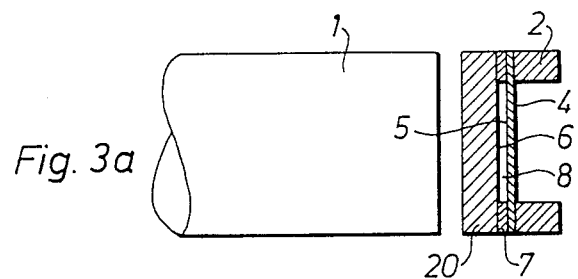
FIGS. 3a, 3b and 3c show three modified forms of sensor in accordance with the invention.

FIG. 3a illustrates a pressure-measuring sensor of a somewhat modified design. Here one of the two surfaces defining the sensing gap is not a plane-polished end of a fiber but rather is part of layer 20 integral with the solid photoluminescent body 2. The surface 20 should have a thickness which exceeds the existing coherent lengths.

Figure 3B:
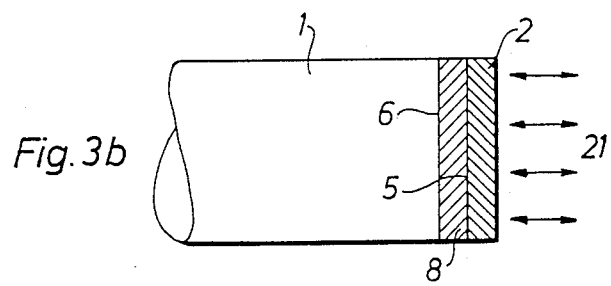

FIG. 3b is an alternative embodiment of sensor, in which the volume 8 is constituted by a solid material connected to the solid photoluminescent body 2. Axial forces, refresented by arrows 21, give rise to a change of the distance between the surfaces 5 and 6 and/or to a change in the refraction index of the solid material either of which will produce a variation in the optical path and will result in a modulation of the curve 10 in accordance with one or other of the modes shown in FIG. 2.

Figure 3C:
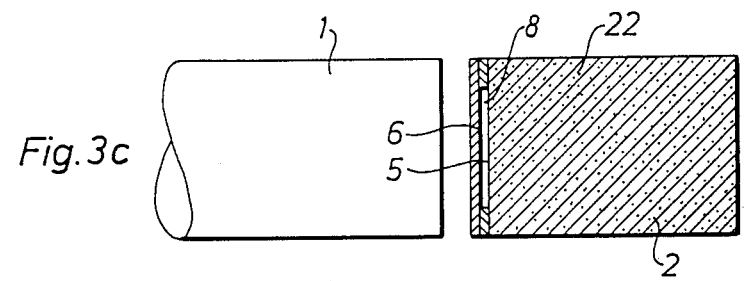

In FIG. 3c the solid photoluminescent body 2 is built up of a transparent material containing metal ions 22 with luminescence properties, for example neodymium ions.

The closed or open volume 8 may be limited by one or two plane-parallel surfaces 5, 6, for example the diaphragm 4.

Figure 4A:
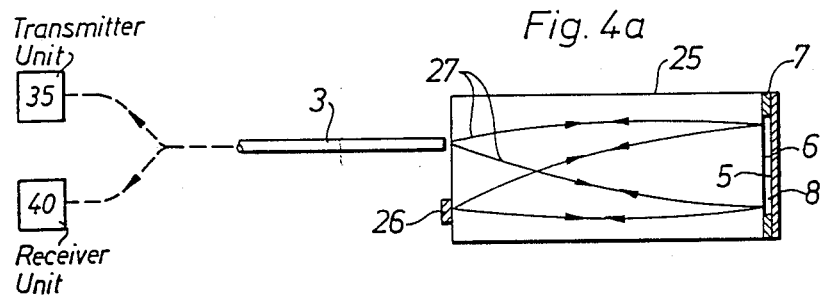
FIGS. 4a and 4b show two further embodiments of sensor.

The embodiments so far described impose certain demands on the optical fiber 1 used. The numerical aperture of the fiber should not be too large, since the angular distribution of propagated optical energy will then be very wide, and this may neutralize the interference phenomena essential for operation of the sensor. This can be avoided by the introduction of one or more lens elements in the sensor portion, as is illustrated in FIG. 4. In FIG. 4a fiber 3, which may have a large numerical aperture, is placed with its end surface adjacent to a cylindrical GRIN lens 25, whereby the diverging bundle of rays 27, emanating from the fiber, is converted into a parallel bundle as it impinges on the opposite end surface 6 of the lens. An interference structrue 5, 6, 7, 8 of the kind described above, is mounted on this end surface 6. The light coming back from the interference structure 5–8 is brought to focus by the lens 25, on a piece of luminescent material 26, from which luminescent light is fed back via the interference structure 5–8, to reenter the fiber 3. Since the reflection of both the excitation and luminescence wavelengths is influenced by the interference structure 5–8, and, according to FIG. 2 will be influenced differently by the quantity to be measured, the relative intensities of said wavelengths can be utilized as signal carriers in the same way as discussed above.

FIG. 4a also shows, purely schematically, a transmitter unit 35 for sending energizing or exciting optical energy to the sensor and a receiver unit 40 for receiving the optical energy coming back from the sensor 7.

Figure 4B:
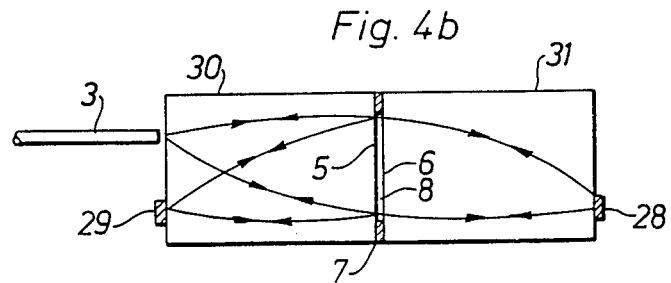

FIG. 4b shows a still further embodiment. This utilizes two GRIN lenses 30, 31 for optical signal division between two luminescence sources 28, 29 with the aid of the interference structure 5, 6, 7, 8, the reflection and transmission properties of which are dependent on the quantity to be measured. In this embodiment, information about the quantity to be measured is transmitted in the form of an intensity relationship between the two luminescence contributions from the materials 28 and 29, respectively.

The specific embodiments discussed above and/or illustrated in the drawings, may be varied in many ways within the scope of the following claims.

What is claimed is:

1. A fiber-optic sensor for detecting a change in a physical quantity which comprises
    two substantially plane parallel interfaces spaced apart by a small enough distance to ensure that multiple reflections of optical energy at a given wavelength between said interfaces will give rise to constructive and destructive interference,
    a body of solid material attached to one of said interfaces capable of emitting photoluminescent optical energy when excited with incident optical energy, one of said photoluminescent and incident optical energies having a wavelength corresponding to said given wavelength,
    optical fiber means, for conveying incident optical energy to said interfaces and said body of solid material and conveying interference-affected incident and photoluminescent optical energies away from said interface, and
    means to allow the change in the physical quantity to affect the optical path length of optical energy in the separation between said parallel interfaces.

2. A fiber-optical sensor according to claim 1, in which the physical separation between the plane-parallel interfaces is arranged to vary with the physical quantity to be measured, and is thus a measure of said quantity.

3. A fiber-optic sensor according to claim 1, in which the magnitude of the refractive index in a volume limited by the plane-parallel interfaces is arranged to constitute a measure of the quantity to be measured.

4. A fiber-optic sensor according to claim 1, in which the deviation from parallelism of the substantially plane parallel interfaces does not exceed one-tenth of a wavelength of at least one of the photoluminescent and incident optical energies.

5. A fiber-optic sensor according to claim 1, in which one of the plane-parallel interfaces is an end surface of the optical fiber means.

6. A fiber-optic sensor according to claim 1, in which the plane-parallel interfaces incorporate at least one reflective coating.

7. A fiber-optic sensor according to claim 6, in which the reflecting coating consists of a dielectric material.

8. A fiber-optic sensor according to claim 7, in which the thickness of the dielectric material is a multiple of half the wavelength for one of the photoluminescent and incident optical energies.

9. A fiber-optic sensor according to claim 6, in which the reflecting coating is a metallic material.

10. A fiber-optic sensor according to claim 1, in which the physical separation between the plane-parallel interfaces is determined by a spacer and an elastic portion of the body of photoluminescent material.

11. A fiber-optic sensor according to claim 1, in which the solid body comprises at least one semiconductor material.

12. A fiber-optic sensor according to claim 11, in which the semiconductor material is selected from the group consisting of GaAs and $Al_xGa_{1-x}As$.

13. A fiber-optic sensor according to claim 1, in which the volume between the parallel interfaces is optically transparent at said given wavelength.

14. A fiber-optic sensor according to claim 1, in which at least one of the plane-parallel interfaces is part of a diaphragm, the deflection of which is a measure of the physical quantity which is to be sensed.

15. A fiber-optic sensor according to claim 1, in which the solid body is optically transparent at said given wavelength and is doped with metal ions having photoluminescent properties.

16. A fiber-optic sensor according to claim 15, in which the doping metal ions are neodymium ions.

17. A fiber-optic sensor according to claim 1, in which the sensor includes at least one lens element attached to said at least one of said interfaces.

18. A fiber-optic sensor according to claim 17, in which said lens element is a GRIN lens.

19. A fiber-optic measuring system for detecting a change in a physical quantity comprising a sensor, a transmitter and receiver unit, arranged to transmit and receive optical energy, and at least one optical fiber means for the transmission of optical energy to and from the sensor located at the point of measurement, characterized in that the sensor comprises at least one solid body, which is arranged to emit photoluminescent optical energy in at least one wavelength range, as well as a volume which is limited by at least two substantially plane-parallel interfaces the mutual separation of which is smaller than half the wavelength for the optical energy emitted from the transmitter unit or the photoluminescent optical energy emitted from the sensor.

20. A method of detecting a change in the optical length between two substantially parallel surfaces generating optical interference patterns due to multiple reflections of optical energy in the gap between said two surfaces, which method comprises supplying incident optical energy and photoluminescent optical energy excited by said incident energy to said gap in such a manner that one of said optical energy supplies is more significantly affected by changes in the interference pattern than the other, and monitoring changes in intensity of at least one of said optical energy supplies to provide a measure of the change in the optical length.

* * * * *